March 27, 1945.   V. WALKER   2,372,535
CURVED GLASS SURFACE AND METHOD AND MEANS FOR MANUFACTURING SAME
Filed Oct. 31, 1941   2 Sheets-Sheet 1

INVENTOR
Victor Walker
BY
Beau, Brooks, Buckley & Beau.
ATTORNEYS

March 27, 1945.   V. WALKER   2,372,535
CURVED GLASS SURFACE AND METHOD AND MEANS FOR MANUFACTURING SAME
Filed Oct. 31, 1941   2 Sheets-Sheet 2
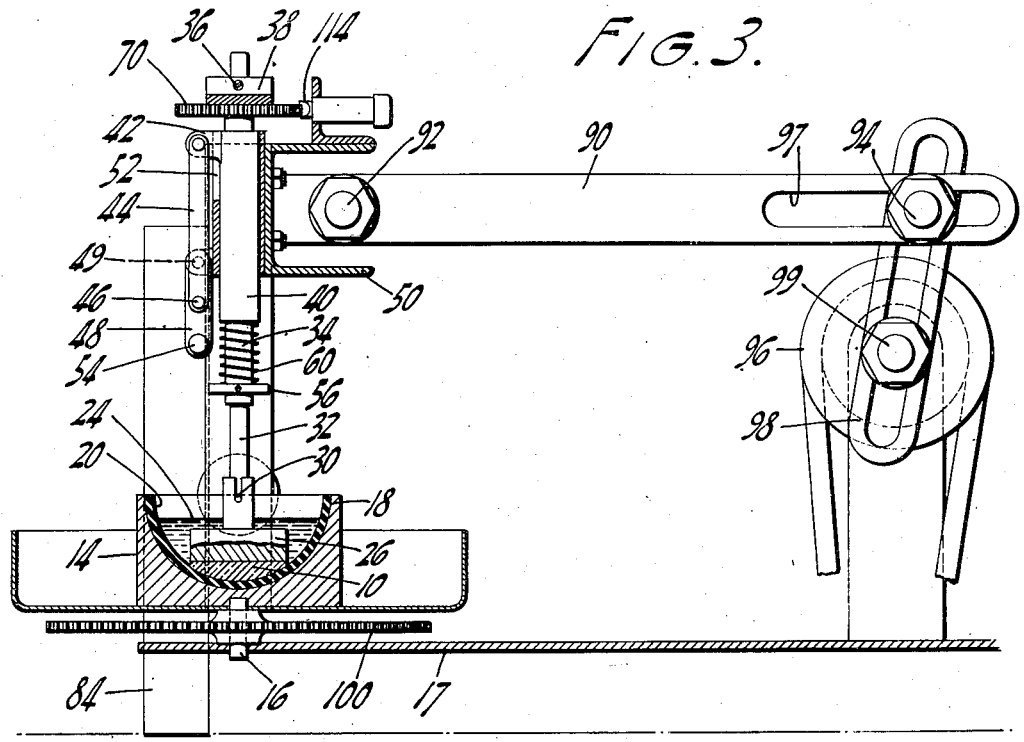
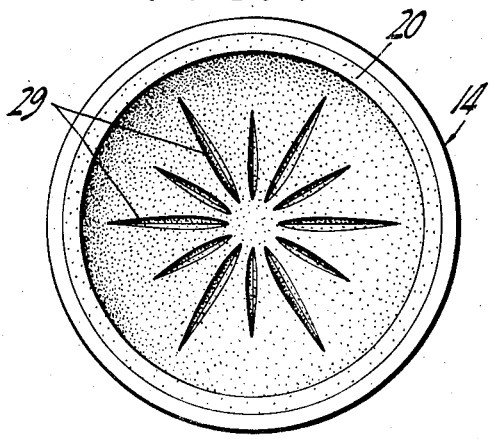
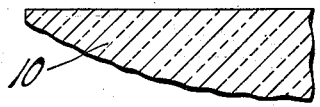
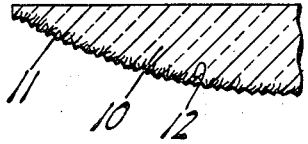
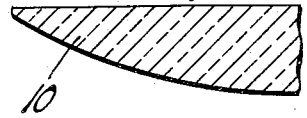
INVENTOR
*Victor Walker*
BY
*Bean, Brooks, Buckley & Bean*
ATTORNEYS Patented Mar. 27, 1945

2,372,535

UNITED STATES PATENT OFFICE 2,372,535

CURVED GLASS SURFACE AND METHOD AND MEANS FOR MANUFACTURING SAME

Victor Walker, Fort Erie, Ontario, Canada, assignor to AlnCin, Inc., Buffalo, N. Y.

Application October 31, 1941, Serial No. 417,362

14 Claims. (Cl. 41—42)

This invention relates to methods and means for manufacturing curved surface glass objects such as lenses or the like, and more particularly to improved methods and means for manufacturing spherically curved surface glass objects.

One of the objects of the invention is to provide an improved method for the stated purpose whereby great economies with respect to manufacturing costs may be effected. Another object of the invention is to provide a method for the stated purpose whereby lenses or the like of improved surface form may be produced. Another object of the invention is to provide improved apparatus for manufacturing spherical lenses or the like in an improved manner. Another object of the invention is to provide improved apparatus for forming optical lenses or the like of improved quality. Other objects and advantages of the invention will appear from the specification hereinafter.

In the drawings:

Fig. 3 is a fragmentary side elevation thereof, with portions shown in section;

Fig. 4 is a top plan, on an enlarged scale, of a lens forming element of the apparatus;

Fig. 5 is a micrograph showing in section a portion of a typical lens blank prior to being processed in accord with the invention;

Fig. 6 is a view corresponding to Fig. 5 of the blank at an intermediate stage of processing; and Fig. 7 is a corresponding view of the finished lens.

Figure 1:
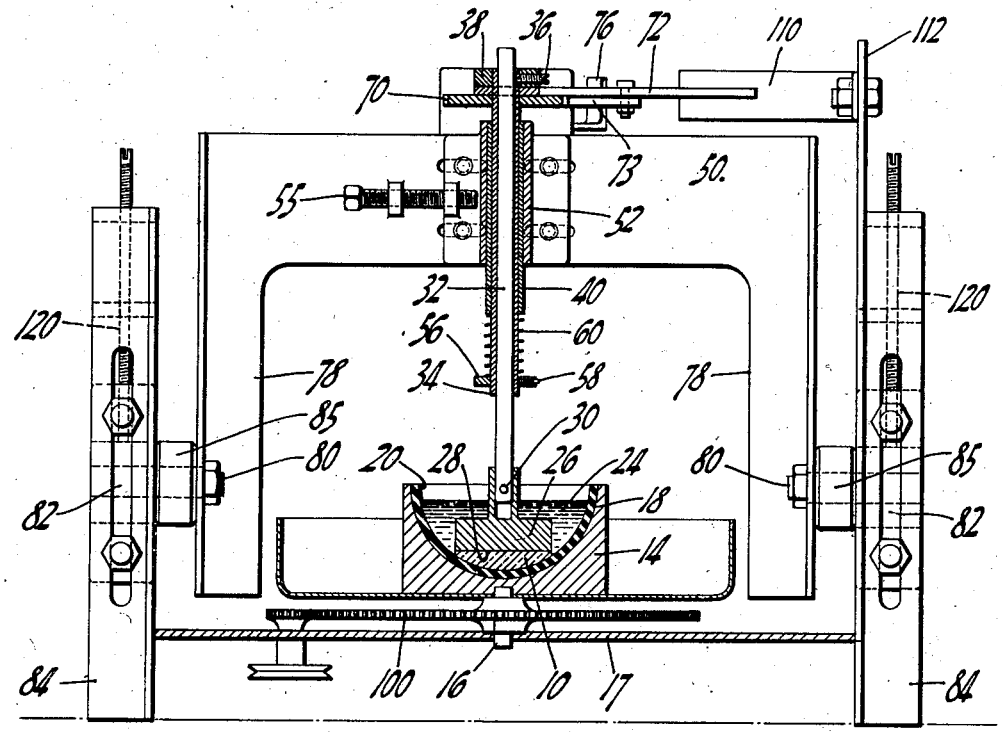
Fig. 1 is a front elevation of an apparatus of the invention, with portions shown in section.

The invention is illustrated in connection with the manufacture of an optical lens from a blank 10 which may have been previously pressed or cast or cut or otherwise formed from suitable stock. Thus, it will be understood that the glass substance of the blank 10 will be of any desired selected form of glass stock, and will be shaped so as to provide excess of glass stock at all sides thereof, for final reduction to the required dimensions. Also, it will be understood that the blank 10 may have been initially relatively accurately shaped, as by a relatively accurate pressing operation, or the like; but that in any case it will be required to finish the surface or surfaces of the blank to optical type clearness and regularity. Also, it will be understood that the fragment of glass stock specifically illustrated and referred to herein may constitute a portion of any form of stock piece or work blank such as may be required from which to manufacture any desired form of finished article.

As the first step of the processing method of the invention the work blank 10 is initially shaped accurately to a predetermined general surface contour. Such shaping may be performed, for example, by grinding the stock piece by means of a bonded abrasive wheel or by means of loose abrasive under a lap as in accord with usual glass grinding practices, or the like, so as to shape the surface of the stock piece to the prescribed general contour thereof while reducing the stock piece to within the neighborhood of the required final dimensions thereof and while eliminating unevenness or foreign substances from the stock piece surface. However, it will be understood that in the event the stock piece 10 has been preformed by some sufficiently accurate shaping method, the surface thereof may be already in suitable condition to be treated by the surface finishing step of the method of the invention without applying thereto a surface grinding as referred to hereinabove; but that in either case the minutely irregular and unfinished surface structure must be reduced and clarified for optical light transmission purposes.

For example, as illustrated by Fig. 6, when the blank 10 is ground to accurately contoured form, as explained hereinabove, it will be found to be minutely serrated at its outer surface as in the manner of typical ground glass; whereby the surface of the stock piece will comprise a series of minute cusps 11 which are impregnated with fused ground glass particles to such an extent that the surface is substantially opaque and of "frosty" appearance. It will also be noted that, as illustrated at 12 (Fig. 6), the sub-surface portions of the ground blank are interiorly fractured as a result of mechanical strains which are invariably set up in the glass in connection with abrading operations thereon. Before the stock piece is suitable for optical purposes this sub-surface fractured and distorted structure must be eliminated.

Figs. 1 to 4 illustrate a machine and method of of the invention for completing the manufacturing process and for eliminating the imperfect surface and sub-surface formations referred to from the native glass therebelow, so as to provide a perfectly regularly surfaced and transparent article of unaltered native glass having an optical-type surface or finish. The machine includes a master bowl 14 which is formed of any suitable rigid material and is mounted for rotation about a central vertical axis by means of a shaft 16 having a bearing upon a stationary frame 17.

The bowl 14 is spherically hollowed in its upper portion concentrically of the axis of rotation thereof, and the curvature of the bowl surface 18 is so dimensioned as to approximately complement the prescribed spherical curvature of the article to be finished by the machine. A liner 20 of resilient and acid-resistant material is mounted interiorly of the bowl 14 so as to be functionally integral therewith, and the liner 20 is outwardly surfaced so as to accurately complement at all portions thereof the curvature prescribed for the surface of the finished article. A bath of glass attacking acid or other chemical reagent is carried within the liner 20, as indicated at 24 (Figs. 1 and 3). The finishing method of the invention involves immersion of the glass stock pieces which have been previously accurately contoured, as by grinding as illustrated by Fig. 6, within the bath 24 while oscillating them transversely in sliding pressure contact relation against the liner 20 while the bowl-liner unit is being rotated.

For this purpose the glass blank 10 is mounted upon a block 26 as by means of an asphalt cementing substance or the like as indicated at 28 (Fig. 1), in the manner of usual lens grinding mount practice. The block 26 is detachably mounted as by means of a bayonet slot and pin connection at 30 upon the lower end of a spindle 32 which extends vertically of the machine. A bearing tube 34 is mounted upon the spindle 32 in the region of its upper portion, and is keyed thereto in longitudinally adjustable relation by means of a set screw 36 screwthreaded through a collar 38 and the tube 34 to bear against the spindle, so that the spindle and tube and collar elements are all rigidly connected as a unit. A sleeve 40 is mounted in telescopic sliding relation about the tube 34, and is formed at its upper end with a lug 42 extending laterally thereof and into pivotal engagement with one end of a toggle link 44. The other end of the toggle link is pivotally connected at 46 to a toggle lever 48 which is pivotally mounted at 49 upon a yoke frame 50. The sleeve 40 is mounted by means of a bearing 52 for vertical sliding movement relative to the frame 50, and thus it will be seen that manual manipulation of the handle portion 54 of the toggle lever will cause the sleeve 40 to move vertically relative to the yoke 50 within its bearing mounting 52.

A thrust collar 56 is adjustably keyed to the spindle tube 34 by means of a set screw 58, and a compression spring 60 is mounted about the tube 34 so as to bear at its opposite ends against the thrust collar 56 and the lower end of the sleeve 40, respectively, so as to elastically urge the spindle 32 at all times to move downwardly relative to the sleeve 40 so as to press the lens blank 10 against the liner 20 of the bowl 14. It will be understood that through adjustment of the position of the thrust collar 56 longitudinally of the tube 34, the pressure with which the lens blank is forced by the spring to bear against the bowl liner may be regulated to any desired degree; and that upon completion of a blank finishing operation the spindle and block may be conveniently withdrawn from the bowl 14 by simply lifting the toggle lever 48. Also, through longitudinal adjustment of the spindle 32 relative to the tube 34 and the collar 38, the machine will be suited to perform upon interchange of variously dimensioned bowls and liners and blank blocks, and the like.

A ratchet wheel 70 is keyed to the spindle and tube assembly 32—34 at a position spaced below the position of the collar 38, and a ratchet lever 72 carrying a pawl 73 is rotatably mounted upon the tube 34 between the collar 38 and the ratchet wheel 70 so as to be vertically positioned thereby while being free to rotate upon the tube. A tension spring 74 is connected to the lever and pawl unit and to a bracket 76 extending from the yoke 50, so as to elastically resist rotation of the lever 72 in clockwise direction when viewed as in Fig. 2, and to keep the pawl in ratchet engaging position.

The yoke 50 includes a pair of opposed leg portions 78 from which stub shafts 80—80 extend in diametrically opposed relation for rotatably mounting the yoke 50 upon corresponding bearing blocks 82—82 which are carried by corresponding stationary posts 84—84 extending vertically from the base of the machine. The elements of the apparatus are so relatively proportioned and arranged that the axis of rotation of the yoke shafts on the bearing members 82—82 extends through the region of the geometric center of the spherical surface defined by the upper face of the bowl liner 20. Spacer washers 85—85 are provided in conjunction with each of the shafts 80—80 to ease the operation of the device. Thus, it will be understood that upon rocking of the yoke member 50 upon the bearings 82—82 the spindle carried lens blank will be thereby caused to oscillate in sliding contact against the inner face of the bowl liner and transversely thereof as viewed in Fig. 3. To provide such oscillation a pitman 90 is pivotally connected as at 92 to the yoke structure and extends therefrom into pivotal connection by means of a pin 94 with a driver wheel 96 at a position eccentrically of the center of rotation thereof. As illustrated in Fig. 3, in order to provide for adjustment of the throw of the pitman movement, the pitman is slotted at 97 so as to permit adjustments of the effective length thereof; and the pin 94 may be arranged to be adjusted to different distances radially of the center of rotation of the drive wheel 96 by being mounted upon a slotted link 98 which is adjustably clamped to the wheel 96 by means of a bolt and nut connection at 99. Thus, it will be understood that the drive wheel 96 will be arranged to be driven by means of a belt or gearing or any other suitable power transmission device so that the pitman 90 will cause the yoke 50 to oscillate upon the bearings 82—82 to obtain the movement of the spindle carried blank relative to the bowl liner referred to hereinabove. Provision for causing the bowl 14 to be rotated about its vertical shaft mounting 16 simultaneously with the oscillation movement referred to hereinabove is arranged for by driving the bowl shaft 16 through means of gearing indicated at 100 (Figs. 1 and 3).

Figure 2:
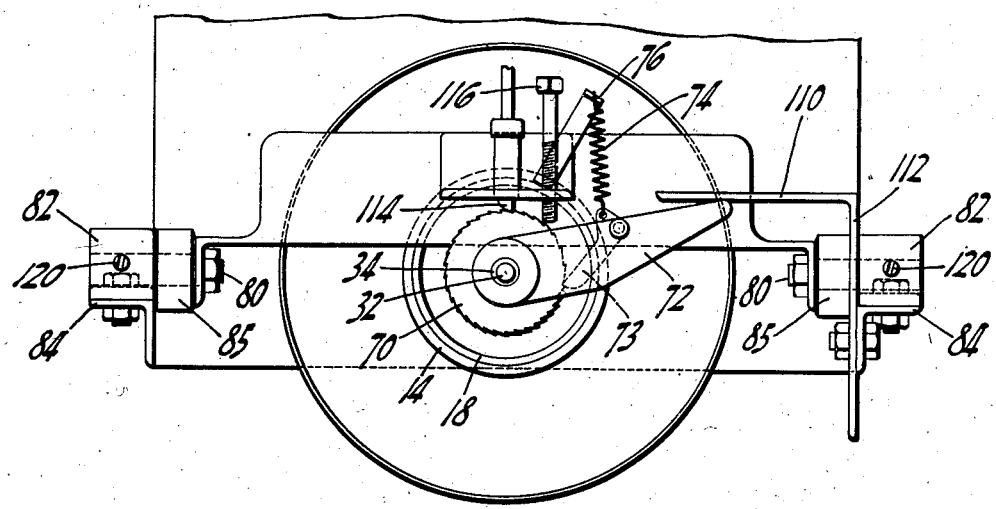
Fig. 2 is a fragmentary top plan thereof.

A cam arm 110 is mounted to extend rigidly from an upwardly extending arm portion 112 of one of the posts 84 so as to abut the free end of the ratchet lever 72, and the cam arm and the ratchet lever 72 and spring 74 are so relatively arranged that when the yoke frame 50 moves toward its forwardly tilted position in connection with the oscillation movement referred to hereinabove, the spring 74 pulls the lever 72 so as to rotate it in a counterclockwise direction from the position thereof as viewed in Fig. 2. This is permitted because the spindle carried end portion of the lever 72 moves forwardly relative to the cam arm 110 in connection with such motion of the apparatus. The ratchet pawl 73, however, locks the lever 72 relative to the spindle tube 34 against relative rotation therebetween when the lever 72 attempts to rotate in clockwise direction as viewed in Fig. 2. Thus, it will be understood that during the return oscillation stroke of the yoke member 50, that is from a forwardly inclined position to a rearwardly inclined position, the lever arm 72 will bear against the cam arm 110 in such manner that the outer end of the lever 72 is prevented from retreating with the yoke frame 50; and thus the ratchet pawl 73 will lock the lever 72 relative to the spindle tube 34 whereby the latter will be rotated about its vertical axis and the spindle carried work blank 10 will be thereby similarly rotated about an axis coincident with the longitudinal axis of the spindle 32. A spring-pressed detent 114 is provided to prevent retrograde movement of the ratchet 70, and an adjustable set screw 116 is screwthreaded upon the yoke 50 to extend as a stop for counterclockwise movement of the lever 72 relative to the tube 34 whereby the scope of action of the ratchet-pawl device upon each oscillation of the yoke may be conveniently regulated. Thus, the extent of work blank rotation in connection with each oscillative movement of the yoke 50 may be regulated at will and by reason of the simultaneous rotation of the bowl 14 and of the work blank 10 and oscillation of the work blank 10, as explained hereinabove, the liner contacting surface portion of the work blank will be thereby caused to traverse substantially all surface portions of the liner 20 while being disposed at different attitudes relative thereto throughout the finishing process. Consequently, a perfectly regular and smooth bearing of the work blank against the liner will be provided at all phases of the machine operation. To assist in this respect the bearing block 52 is preferably mounted upon the yoke 50 so as to be adjustable laterally and transversely of the direction of the longitudinal axis of the spindle, as by means of an adjustment screw 55, so that the spindle may be minutely adjusted to be in alignment with the geometric center of the spherical outer surface of the liner 20.

The character of the acid bath contained within the liner 20 will, of course, depend upon the mechanical and physical characteristics of the glass stock of the work blank being processed. For example, when working with glass stock of relatively high metal contents the acid bath will preferably comprise a mixture of hydrofluoric and sulphuric acids in water. However, when working with a high barium type glass it is preferred to employ an aqueous solution of hydrofluoric and sulphuric and phosphoric acids or perhaps an aqueous solution of hydrofluoric and phosphoric acids alone. In any case the acid bath solution will be adapted to react with the glass stock piece so as to dissolve the frosted and cusped and fractured surface and sub-surface structural portions thereof away from the native glass therebeneath. It appears that the hydrofluoric acid ingredients of the bath attack the glass substance at the surface of the stock piece to form silica-fluoride salts which immediately react with the modifying sulphuric acid or phosphoric acid ingredient. Thus, the silica-fluoride salts which would otherwise tend to attach to the glass structure to provide the effect which is commonly known as "etched" glass are instead immediately converted into fluoric acid and salts of sulphuric or phosphoric acids, as the case may be. Since the silica salts of sulphuric or phosphoric acids so produced do not have the tendency to adhere to the native glass therebelow, these salts precipitate as loose solids into the bath while the acid-glass reaction continues.

Thus, it will be understood that the method of the invention provides finishing of a previously accurately shaped stock piece by subjecting the latter to the action of a suitable glass-attacking acid while causing the stock piece surface to be finished to be oscillated while in slide bearing contact against the resilient master liner which is shaped complementary to the desired curvature of the finished product. I have found that it is preferable to form the liner 20 of a relatively live type of rubber, so that it will be highly resilient and yet impervious to action of the acid bath for which it serves as a container; and to cause the stock piece to bear firmly against the liner as it is oscillated relative thereto while the bowl is rotating. For example, when working upon a 2" diameter lens blank, I have found that it is preferable to adjust the spindle spring mechanism so that a pressure of approximately 7 lbs. is exerted thereby to press the lens blank firmly against the liner. I find that the finishing action of the apparatus is greatly facilitated and improved if the stock piece contacting face of the line 20 is prepared by grinding it by means of an abrasive wheel or the like to an accurately contoured surface form. Thus, the curvature of the liner is provided of maximum accuracy, and the ground rubber surface appears to have a superior wiping and acid controlling action relative to the stock piece, when compared to a "slick" molded rubber surface for the same purpose. Also, as illustrated in Fig. 3, the stock contacting surface of the bowl liner 18 is preferably grooved as indicated at 29 (Fig. 4) so as to provide channels for continuously feeding fresh acid supplies to the reaction zones between the liner 20 and the relatively high portions of the stock piece. The dimensioning and arrangement of such grooves will of course be regulated to suit different conditions of operation such as involve different rates of glass reduction and acid supply requirements.

It will be understood that in accord with the method of the invention, as the initial acid reaction takes place upon the ground glass stock, the lens blank is simultaneously moved to slide against the master bowl liner, whereby the solid precipitates of the chemical reactions are displaced from between the lens blank and the liner by the mechanical action of the apparatus while fresh supplies of the acid bath are being continuously drawn into the region between the lens blank and the liner. As this process continues, the irregular and otherwise imperfect surface and sub-surface portions of the stock piece become progressively eliminated until finally only a perfectly clear and optically regular surface of native glass is exposed. It appears that as the acid attack and lens blank oscillation processes continue, the relatively high portions of the stock piece are progressively exposed to the most intense acid action because the acid action by-products are continuously removed therefrom by the mechanical action of the relative movement between the lens blank and the liner 20. However, the relatively low portions of the stock piece become effectively masked by the precipitate solid substances which are deposited thereon in conjunction with the mechanical movement of the parts. Thus, the relatively low portions of the stock piece are effectively masked from acid attack, and there is thereby provided an automatic leveling of the stock piece to a newly exposed and perfectly regular native glass surface, as illustrated by Fig. 7.

The method of the invention provides great economies with respect to time and labor costs as compared to prior methods for similar purposes. For example, the initial grinding or shaping operation of the method of the invention will require only a few minutes of time, depending upon the size of the blank and the dimensional irregularity thereof and the amount of excess glass to be removed therefrom. The second or chemical-physical finishing step of the invention may then be completed in something like one-half hour. It is therefore obvious that from the standpoint of time and labor costs involved the method of the invention effects great economies. Also, it will be understood that the method of the invention effects substantial economies from the standpoint of materials consumed, in that only one grinding operation need be employed, and in that the ingredients of the acid bath of the invention are relatively inexpensive.

The greatest features and advantages of the invention as compared to the prior art are, however, concerned with the qualities of the finished articles. Particular attention is called to the fact that throughout the entire finishing step of the method of the invention the stock piece 10 is at all times separated from the liner 20 by a thin film of liquid which lubricates the relative movement therebetween and positively separates the surfaces thereof so as to avoid possible rubbing or scratching action by the master pad or liner 20 against the glass stock. Thus, the finishing method of the invention distinguishes fundamentally from any abrasion-type finishing method such as rouge buffing processes as are conventionally employed in the optical trades.

Conventional abrasive-employing methods of glass shaping such as are presently used in connection with the optical arts accomplish removal of the excess glass stock through simple scratching and gouging processes conducted under substantial pressures and with successively finer grades of abrasive granules until finally the finest available grade of rouge is employed to produce a buffed-type finished surface. Thus, the finished surface is superficially of highly polished and glossy form and appears to be of regular contour; but it is known that such finished surfaces actually comprise "rubbed" and secondarily fused or welded glass structure whereby the outer layers of the surfaces are of reduced light transmitting capacities and are particularly susceptible to attack by elements of the atmosphere in such manner as to induce deterioration of the character referred to in the trade as "weathering." The explanation for this appears to be that whenever a conventional abrasion process is directed against a glass surface, and as the grains of abrasive dig multitudes of grooves and scratches into the glass surface, as an incident to each gouging or scratching action of the abrasive granules the adjacent glass structure is subjected to cracking or fracturing stresses.

Microscopical examination of abrasively treated glass bodies will invariably reveal the presence of such sub-surface fractures; and it has been found that such fracturing tendencies are present even in conjunction with use of the finest grades of abrasive materials. Consequently, no matter how fine the grading of the abrasive or rouge material in connection with conventional lens finishing methods, the inherent tendency of such method is to continue to provide sub-surface fracturing as the surface reduction continues, and it is only because of the rubbing and re-welding action of the finishing laps that the final glass surface appears to be superficially smoothed-over and regular. Thus, it will be appreciated that the surface formations of conventionally ground and finished lenses or the like are inherently imperfect, as distinguished from the qualifications of the native glass material from which the stock piece is originally formed. It will also be appreciated that surfaces finished by such abrasion methods are of "rubbed" nature, and are therefore highly glossy and inherently guilty of high reflection loss characteristics.

As distinguished from the above, the finished surface of the present invention is provided by first shaping the stock piece to the prescribed general surface contour thereof through use of a simple yet accurate shaping operation which leaves the stock piece in only locally irregular surface form; while the second step of the method eliminates the locally irregular and stressed glass structure through use of a basic glass-reactive acid reagent and, if preferred, with a secondary or acid product modifying reagent as explained hereinabove so as to present a thoroughly native glass structure of identical contour which contains no sub-surface imperfections or surface or sub-surface characteristics artificial to the qualities of the native glass of the stock piece. Thus, the finished surface of the invention is of relatively non-reflective characteristics, having been subjected to nothing resembling a buffing or rubbing process. Also, the surface comprises purely primary glass structure which is free of fracturing or other stress results, and is therefore of unreduced light transmitting ability and invulnerable to attack by agencies such as normally produce rapid deterioration effects known as "weathering" in connection with glass surfaces finished by abrasion type finishing methods of the prior art.

Another important distinction between the method of invention and methods of the prior art is that whereas, in connection with lap grinding and finishing operations of the prior art the laps are depended upon to provide accurate shaping of the article as it is being finished, the laps invariably wear under the action of the abrasive materials and are thus constantly becoming inaccurate as to dimension and form. Thus, a perfect shaping of the finished article by such a method is impossible. As distinguished from this, in the method of the present invention the stock piece is initially shaped to the prescribed general contour thereof, and the locally irregular surface structure resulting therefrom is then removed by means of a chemical agent without introduction of contour errors such as inevitably accompany use of abrasive applying laps in conjunction with the methods of the prior art. This is because the acid controlling master liner 20 of the invention is provided of elastic material, and it is thereby adapted to conform exactly to the prescribed general contour of the surface, and thus does not attempt to cause the contour of the stock piece to deviate therefrom as the chemical reduction process continues. However, as the chemical treatment proceeds the master 20 controls the removal of the acid-masking salt by-products from the local depressions of the surface being processed and so controls replenishment of fresh acid supplies to the highest portions of the surface being processed that an accurate leveling of the previously irregular surface structure is provided in the novel manner of the invention. Thus, the form of the finished surface of the article of the invention is more accurately controllable as compared to processes of the prior art, and an improved product is obtainable.

I have found as a result of many experiments in accord with the method of the invention the amount and rate of glass stock removal depends to some extent upon the degree of pressure applied between the work blank and the liner 20. Thus, the character of the finishing operation at various portions of the liner contacting surface of the work blank may be minutely regulated by regulating the pressure at which the work blank is urged against the liner at different portions thereof and at different stages of the finishing process. For example, I find that by mounting the bearing blocks 82—82 upon the posts 84—84 so as to be vertically adjustable as by means of adjustment screws 120, the pressures between the work blank and the bowl liner 20 at different stages of the finishing operation may thereby be varied and minutely regulated so that exact control of stock removal rate at different portions of the work blank may be provided. Thus, the curvature of the finished surface may be modified and/or regulated in any manner desired.

It will be understood that although the drawing herein illustrates the method of the invention as being practiced in conjunction with the production of optical lenses, or the like, any other shape of surface may be produced by suitably shaping the master pad 20 so as to complement the desired contour of the finished article and by suitably actuating the spindle or other stock piece carrying means so as to provide proper relative motion between the stock piece and the master pad to eliminate the ground and fractured surface and sub-surface structure and to reduce the stock piece finally to the desired dimension and shape.

It is of course contemplated that in lieu of the specific grinding method illustrated and described hereinabove as illustrative of the original general shaping process of the invention, any other suitable accurate shaping process may be employed to reduce the stock piece to prescribed shape. For example, in some instances it may be feasible to mold the stock piece to sufficiently accurate surface form so that the master-controlled acid finishing process of the invention may be applied directly thereto with suitable results.

It will be understood that in lieu of the single lens blank form of mounting upon the spindle 32 illustrated and described hereinabove, any number of relatively small lens blanks may be suitably mounted upon a relatively larger spindle block so that a plurality of lens blanks may be finished simultaneously upon operation of the method and apparatus as described herein; and that although only one form of the invention has been illustrated and described in detail hereinabove, that various changes may be made therein without departing from the spirit of the invention and the scope of the appended claims.

What is claimed is:

1. The method of shaping and finishing a curved glass surface comprising subjecting said surface to rubbing against a curved rubber mat with an aqueous hydrofluoric acid bath therebetween.

2. The method of shaping and finishing a spherical glass surface comprising subjecting said surface to rubbing against a spherically curved resilient mat with an aqueous hydrofluoric acid bath therebetween.

3. The method of shaping and finishing a curved glass surface comprising subjecting said surface to rubbing against a curved resilient mat having an outer glass contacting surface portion of a curvature approximately complementing the desired final curvature of said glass surface with an aqueous hydrofluoric acid and sulphuric acid bath therebetween.

4. The method of shaping and finishing a curved glass surface comprising subjecting said surface to rubbing against a curved rubber mat with an aqueous hydrofluoric and phosphoric acid bath therebetween.

5. The method of shaping and finishing a curved glass surface comprising subjecting said surface to rubbing against a curved resilient mat having an outer glass contacting surface portion of a curvature approximately complementing the desired final curvature of said glass surface with a glass-reactive acid bath therebetween.

6. The method of shaping and finishing a spherical glass lens comprising subjecting a glass lens blank to rubbing against a spherically curved rubber mat with an aqueous hydrofluoric and sulphuric acid bath therebetween.

7. The method of shaping and finishing a spherical glass lens comprising subjecting a glass lens blank to rubbing against a spherically curved resilient mat having an outer glass contacting lens portion of a curvature approximately complementing the desired final curvature of said lens with an aqueous hydrofluoric and phosphoric acid bath therebetween.

8. The method of shaping and finishing a curved glass surface comprising subjecting said surface to rubbing against a curved rubber mat with an aqueous hydrofluoric acid bath therebetween while varying the rubbing pressure between said surface and said mat when operating against different portions of said surface.

9. An apparatus for shaping and finishing a glass work blank to curved surface form comprising a substantially rigid bowl element, a resilient liner for said bowl element having an inner curved contour substantially complementing the desired curvature of the finished product, means adapted to mount said work blank and to press the latter against said liner curved surface and to oscillate said work blank in sliding relation thereagainst, and means for introducing glass-reactive liquid substance between said liner and said work blank during oscillation thereof.

10. An apparatus for shaping and finishing a glass work blank to spherically curved surface form comprising a substantially spherical rigid bowl element, a resilient liner for said bowl element having an inner curved contour substantially complementing the desired curvature of the finished product, means adapted to mount said work blank and to press the latter against said liner curved surface and to oscillate said work blank in sliding relation thereagainst, and means for introducing glass-reactive liquid substance between said liner and said work blank during oscillation thereof.

11. An apparatus for shaping and finishing a glass work blank to curved surface form comprising a substantially spherical rigid bowl element, a resilient rubber liner for said bowl element having an inner contour substantially complementing the desired curvature of the finished product, means adapted to mount said work blank and to press the latter against said liner curved surface and to oscillate said work blank in sliding relation thereagainst, and means for introducing glass-reactive acid solution between said liner and said work blank during oscillation thereof.

12. An apparatus for shaping and finishing a glass work blank to curved surface form comprising a substantially rigid bowl element, a resilient liner for said bowl element having an inner curved contour substantially complementing the desired curvature of the finished product, means adapted to mount said work blank and to press the latter against said liner curved surface and to oscillate said work blank in sliding relation thereagainst under different pressures at different portions of said liner, and means for introducing glass-reactive liquid substance between said liner and said work blank during oscillation thereof.

13. The method of shaping and finishing a spherical glass surface comprising subjecting said surface to rubbing against a spherically curved rubber mat while feeding an aqueous hydrofluoric acid bath into the space therebetween.

14. The method of shaping and finishing a curved glass object comprising rubbing said contoured object against a curved resilient mat while feeding an acid bath therebetween, said acid bath comprising a mixture of glass-reactive acid and a reagent adapted to react with products of the action of said glass-reactive acid upon said glass stock to convert said products to substances readily removable from said glass stock by said rubbing action.

VICTOR WALKER.